US010864777B2

(12) United States Patent
Quantinet et al.

(10) Patent No.: US 10,864,777 B2
(45) Date of Patent: Dec. 15, 2020

(54) TIRE WEAR MONITORING DEVICE

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Benjamin Quantinet, Clermont-Ferrand (FR); Damien Bardin, Clermont-Ferrand (FR); Stephanie Cambon, Clermont-Ferrand (FR); Jonathan Lejeune, Clermont-Ferrand (FR)

(73) Assignees: Compagnie Generale Des Etablissements Michelin, Clermont-Ferrand (FR); Michelin Recherche et Technique, S.A., Granges-Paccot (CH)

( * ) Notice: Subject to any disclaimer, the term of this patent is extended or adjusted under 35 U.S.C. 154(b) by 573 days.

(21) Appl. No.: 15/516,408

(22) PCT Filed: Oct. 15, 2015

(86) PCT No.: PCT/EP2015/073851
§ 371 (c)(1),
(2) Date: Apr. 2, 2017

(87) PCT Pub. No.: WO2016/059143
PCT Pub. Date: Apr. 21, 2016

(65) Prior Publication Data
US 2017/0291456 A1    Oct. 12, 2017

(30) Foreign Application Priority Data

Oct. 15, 2014 (FR) .................................. 14 59865

(51) Int. Cl.
*B60C 11/24* (2006.01)
*B60C 11/03* (2006.01)
*B60C 23/04* (2006.01)

(52) U.S. Cl.
CPC .......... *B60C 11/246* (2013.01); *B60C 11/032* (2013.01); *B60C 11/0323* (2013.01); *B60C 11/24* (2013.01); *B60C 23/04* (2013.01)

(58) Field of Classification Search
CPC .. B60C 11/246; B60C 11/032; B60C 11/0323
See application file for complete search history.

(56) References Cited

U.S. PATENT DOCUMENTS 2,322,505 A      6/1943  Bull
2012/0227883 A1*  9/2012  Audigier ............... B60C 11/032
                                                        152/209.18

FOREIGN PATENT DOCUMENTS

FR       2971732 A1    8/2012
WO    2011039194 A1    4/2011

* cited by examiner

*Primary Examiner* — Jacob T Minskey
*Assistant Examiner* — Melody Tsui
(74) *Attorney, Agent, or Firm* — Dickinson Wright PLLC; Steven Hurles

(57) ABSTRACT

The device for monitoring the wear of a tread during running comprises at least one internal cavity intended to form a void opening on to a tread surface after predefined partial wearing of the tread, this tread comprising a wear limit corresponding to a maximum thickness of wearable material, this device comprising a measurement well opening on to the tread surface, this measurement well having a bottom formed of a first part and of a second part which are offset from one another in the depth, these two parts of the bottom being situated at different distances with respect to the tread surface when new.

7 Claims, 1 Drawing Sheet

Section on II-II

Section on III-III

TIRE WEAR MONITORING DEVICE

CROSS-REFERENCE TO RELATED APPLICATION

The present invention claims priority to PCT International Patent Application Serial No. PCT/EP2015/073851 filed Oct. 15, 2015 entitled "Tire Wear Monitoring Device," which claims the benefit of FR Patent Application Serial No. 1459865 filed Oct. 15, 2014, the entire disclosures of the applications being considered part of the disclosure of this application and hereby incorporated by reference.

BACKGROUND OF THE INVENTION

1. Field of the Invention

The present invention relates to tire treads and, more particularly, to a device for monitoring the degree of wear of such treads.

2. Related Art

Heavy vehicle tires are provided with a tread comprising a tread pattern formed of a collection of raised elements delimited by cuts. Among these cuts a distinction is made between the grooves that are notably intended to allow effective drainage of any water that might be present on the roadway in wet weather.

During running, the tread becomes worn down to a wear limit that indicates to the driver that he needs either to replace this tire with a new tire or to retread, which means to say to put a new tread on the same casing. This wear limit is, as a general rule, fixed by national legislation which, for safety reasons, dictates a minimum depth of tread void.

The user needs a wear indicator or tell-tale informing him in an easy way whether or not his tires have reached this regulatory wear limit.

It is common practice to provide the bottom of certain grooves with rubber reliefs, these reliefs having a determined height with respect to the bottom of the groove so as to indicate this wear limit with precision. These reliefs (which form little platforms) are molded during the operation of molding the tire tread. When all the grooves open on to the tread surface when new, these wear indicators are visible from the start. This is no longer necessarily the case these days because tires intended to be fitted to heavy vehicles have changed and adopt tread pattern designs that differ appreciably from what they used to be.

In particular, treads are provided with cavities that are not intended to open on to the tread surface until the tread has become partially worn. In this way it is possible to keep the stiffness of a new tread higher while at the same time having just enough grooves or voids open on to the tread surface to act as volumes for the drainage and flow of any water that may be present on the roadway.

Application WO 2010/030276 A1, which describes a tire the tread of which comprises such internal cavities opening on to the tread surface of the tread after a predetermined amount of partial wear, is particularly known. Also known is application WO 2011/039194 A1 which describes a novel form of groove undulating between a high level and a low level (low is to be understood as meaning deeper down in the thickness of the tread than the high level). This type of groove has parts that can open on to the tread surface before other parts, the latter remaining hidden from the user until they open on to the tread surface after a certain amount of wear.

Document FR2971732 discloses a tire of which the tread comprises cavities under the tread surface which cavities are intended to form new grooves after partial wear. These cavities are provided with continuous ribs of a width less than the width of the cavities, these ribs being intended to protect the bottom of these cavities from potential attack from external objects that may enter these cavities.

For these types of new tread pattern there is a need for a device able to meet the regulations that dictate that there be a means of checking and monitoring tread wear present, it being possible for this tread to comprise internal cavities intended to appear after the said tread has become part-worn.

Definitions

The void ratio of a tread pattern is equal to the ratio between the surface area of the voids (grooves) delimited by the blocks and the total surface area (contact area of the blocks and surface area of the voids). A low void ratio indicates a large block contact area and a small surface area of voids between the blocks.

The surface void ratio of a tread pattern is equal to the ratio between the surface area of the voids (essentially formed by grooves) delimited by the raised elements (blocks, ribs) and the total surface area (contact area of the raised elements and surface area of the voids). A low void ratio indicates a high contact area of the tread and a small surface area of voids between the raised elements.

The volume void ratio of a tread pattern of a tread when new is equal to the ratio between the volume of the voids (notably formed by grooves, cavities) delimited by the raised elements (blocks, ribs) and the total volume of the tread comprising the volume of wearable material and the volume of the voids. A low volume void ratio indicates a small volume of voids relative to the volume of the tread. For each wear level it is also possible to define a void volume.

Equatorial mid plane: this is a plane perpendicular to the axis of rotation and passing through those points on the tire that are radially furthest away from the said axis.

A block is a raised element formed on the tread which is delimited by voids or grooves and comprises lateral walls and a contact face intended to come into contact with the roadway. This contact face has a geometric center defined as being the center of gravity or barycenter of the face.

A rib is a raised element formed on a tread, this element extending in the circumferential direction and making a circuit of the tire. A rib comprises two lateral walls and a contact face, the latter being intended to come into contact with the roadway during running.

A radial direction in this document means a direction perpendicular to the axis of rotation of the tire (this direction corresponds to the direction of the thickness of the tread).

A transverse or axial direction means a direction parallel to the axis of rotation of the tire.

A circumferential direction means a direction tangential to any circles centered on the axis of rotation. This direction is perpendicular both to the axial direction and to a radial direction.

A tread has a maximum thickness within which can be molded all kinds of cavities that at one moment or another open on to the tread surface of the tread. This same tread has a limit thickness of material that can be worn away during running. This limit thickness of wearable material corresponds to a limit beyond which it is recommended that the tire should no longer run because the void volumes opening on to the tread surface have reached a limit that should not be crossed. It is then necessary to perform a regrooving operation (operation whereby new grooves are made in the remaining thickness) or to change the tire or at least retread it in order to affix a new tread. Certain national regulations dictate that there be indicators present to allow the user to know where this wear limit is.

A cut generically denotes either a groove or a sipe and corresponds to the space delimited by two walls of material that face one another and are distant from one another by a non-zero distance (referred to as the "width of the cut"). It is precisely this distance that differentiates a sipe from a groove: in the case of a sipe, this distance is suitable for allowing the opposing walls that delimit the said sipe to come into at least partial contact at least when the sipe enters the contact patch in which the tire is in contact with the roadway. In the case of a groove, the walls of this groove cannot come into contact with one another under usual running conditions.

An internal cavity or cavity beneath the tread surface when new means, in this document, a void volume formed within a tread when new, this void volume being intended to open on to the tread surface of the tire after a predetermined amount of part-wear, so as to form a new groove and new edge corners.

A void generically means either a groove or an internal cavity.

SUMMARY OF THE INVENTION AND ADVANTAGES

The present disclosure seeks to provide a means of checking and monitoring tire tread wear, these treads comprising internal cavities when new.

To that end, one aspect of the disclosure is a device for monitoring the wear of a tread during running, this tread comprising at least one internal cavity intended to form a groove open on to a tread surface after predefined partial wearing of the tread.

A wear limit is defined on this tread: this wear limit corresponds to a maximum thickness of wearable material beyond which the national regulations dictate that the tire be regrooved or changed or alternatively retreaded.

A maximum void depth is defined for this tread: this maximum depth corresponds to the depth of the bottom of the grooves and/or internal cavities furthest towards the inside of the tread, this distance being measured when new between the tread surface and the said bottom. This maximum depth is greater than the wear limit so as to maintain a sufficient drainage volume (these two values being measured with respect to the tread surface of the tread when new).

There is proposed a device for checking and monitoring tread wear during running, this tread comprising at least one cavity opening on to the tread surface after a predetermined amount of partial wear. This device comprises a measurement well opening permanently, which means to say from new, on to the tread surface of the tread, this measurement well having a bottom formed of a first part and of a second part which are offset from one another in the depth and in the main direction of the cavity. These two parts forming the bottom are situated at different distances with respect to the tread surface when new and are offset from one another in the main direction of the cavity. The first part has a width substantially equal to the width of the cavity and a flat top surface situated at a distance from the tread surface that is equal to the wear limit. The second part which occupies the width of the cavity is situated at a distance equal to the maximum depth of the internal cavities. The main direction of the cavity corresponds to the main direction of a flow of liquid in the cavity during running.

The measurement well is dimensioned to allow measurements of the depth of the first part and of the depth of the second part while at the same time limiting as far as possible the impact that the presence of this well has on the reduction in stiffness of the tread. The first part is carefully dimensioned so that it occupies only a very short length of the cavity in which it is formed. For preference, the length of this part, measured in the main direction of the cavity, is at most 50% of the length of opening of the measurement well on the tread surface when new.

Thanks to this disclosure it is possible to have a tire the tread of which is provided with voids that are not visible on the tread surface when new but at the same time meet the regulations that dictate the presence of wear indicators allowing this tread to be checked and alerting the user when the wear limit is reached.

Advantageously, this measurement well has an opening on to the tread surface of which the geometry is of elongate shape and suited to closing up at least in part when it comes into contact with the roadway. This arrangement is particularly advantageous for preventing the ingress of foreign bodies such as stones into the measurement well during running.

In another alternative form of embodiment, the measurement well has a frustoconical shape. It is possible for the conical shape to widen or indeed to narrow towards the bottom of the well so as to further limit the ingress of foreign bodies into the measurement well. One advantage of a frustoconical shape is that it makes it easier to see the two parts of the bottom and thus confirm the presence of the wear limit indicator.

In order to make it easier to identify each wear monitoring device, it is possible to provide the tread with markings indicating the location of each device.

Monitoring to check for tread wear using the device according to the disclosure is easy because after measuring the respective depths on the two bottom parts of the well of the device, the difference in value clearly indicates that this is a wear indicator being studied. When one of the parts of the bottom of a measurement well lies flush with the tread surface then it is necessary to take action either by changing the tire or by retreading this tire or by regrooving, namely cutting new grooves in order to regain a minimum depth of voids that open on to the tread surface.

With a view to regrooving the tread, which means to say to recreating new grooves, it is advantageous to provide on the part of the bottom of the measurement well closest to the tread surface when new (therefore the part that indicates the wear limit) the presence of a well referred to as a regrooving well, the depth of which corresponds to the maximum depth of the regrooving.

To make it easier to locate each device of the disclosure on the tread when new it is advantageous to provide for an additional thickness to be formed on the tread surface of the tread when new and for the measurement well of the device to open into this additional thickness. This additional thickness may be of the order of 0.5 to 1.5 mm.

According to another alternative form and to make it easier to locate each device on the tread when new, it is advantageous to plan for a depression part to be formed on the tread surface of the tread when new and for the measurement well of the device to open into this depression part. In this alternative form, and contrary to the preceding alternative form comprising an additional thickness, the impact on running is near-zero when new.

For preference, each measurement well is oriented radially, which means to say at right angles to the tread surface when new, towards the axis of rotation of the tire provided with the tread.

In another alternative form of the disclosure, the measurement well opens to the inside of the tread into an internal cavity, this internal cavity having a bottom situated at a distance from the tread surface of the tread when new that is equal to the maximum depth. On the bottom of this internal cavity there is also molded a relief of which the height—measured with respect to the bottom of the internal cavity—is such that its upper surface corresponds to the level of the legal wear limit. Advantageously, the measurement well arrives on the surface of the relief and on the bottom of the internal cavity.

In another alternative form of the disclosure, the measurement well of the device for checking tread wear does not open into an internal cavity intended to form a groove.

Advantageously, the measurement well needs to allow at least sight of the additional thickness over at least 50% of the cross section of the said well while at the same time maintaining a maximum void depth measurement area.

The disclosure also relates to an appropriate measuring instrument for measuring the two depths in one and the same operation. According to this disclosure, the measurement instrument comprises two distinct measurement means, a first means which measures from the tread surface of a tread a first depth corresponding to the wear limit and a second means measuring from the tread surface of a tread a second depth. This measurement instrument also comprises means of displaying the first and second depths.

This measurement instrument may be constructed on the basis of a depth gauge as commonly used for assessing the remaining thickness of wearable material on a tire tread. Such an instrument according to the disclosure comprises two rods that are mobile and able to reach the bottom of the measurement well and to detect the two parts that form the bottom of the said well. Means supplement the device to provide the respective depths of the two bottom parts.

Further features and advantages of the invention will become apparent from the description given hereinafter with reference to the attached drawings which, by way of non-limiting examples, show embodiments of the subject matter of the invention.

DETAILED DESCRIPTION OF THE ENABLING EMBODIMENT

To make the figures easier to understand, the same reference signs are used for describing alternative forms of the disclosure where these reference signs refer to elements the nature of which is the same either structurally or indeed functionally.

Figure 1:
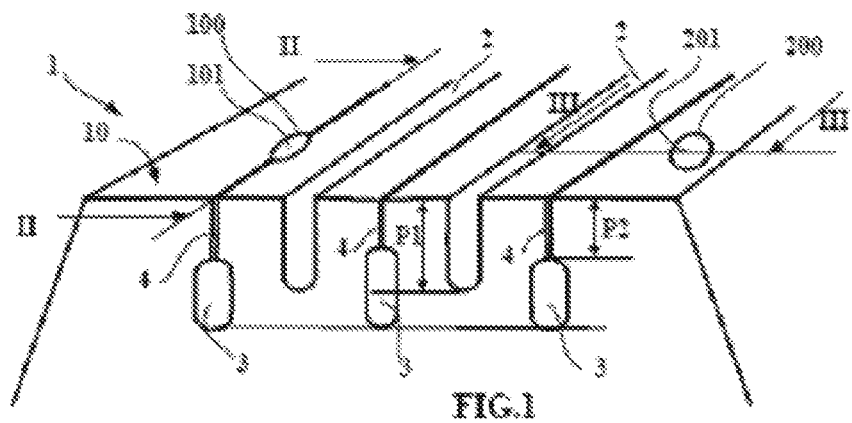
FIG. 1 is a perspective view of part of a tread according to the disclosure.

The heavy vehicle tire tread 1 shown in this FIG. 1 comprises a tread surface 10 when new, on to which there open two grooves 2 of circumferential overall orientation. These two grooves 2 have the same depth P1.

This tread 1 also comprises three internal cavities 3 of circumferential overall orientation and which are intended to open on to the tread surface after a predetermined amount of tread wear. These three internal cavities 3 are extended towards the tread surface by sipes 4. The predetermined wear P2 beyond which new grooves form is such that these new grooves are formed before the two grooves present when new have disappeared (P2 is therefore less than P1). A tread pattern such as this combines both a suitable volume for draining away water present on the road surface notably in wet weather and a suitable level of stiffness whatever the degree of tread wear.

Depicted on this tread example is one alternative form of a tread wear indicator device according to the disclosure.

A device 100 is located in such a way as to be molded in line with an internal cavity 3 and comprises a measurement well 101 that opens on to the tread surface 10 and extends into the depth of the tread. This first device 100 is located on the sipe 4 that extends the internal cavity 3.

Figure 2:
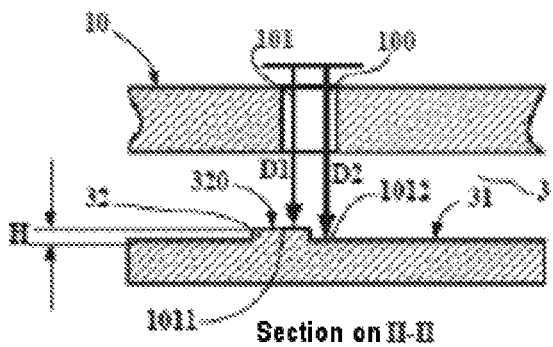
FIG. 2 is a view in cross section on a plane intersecting FIG. 1 along the line II-II.

The wear limit indicator device 100 is shown in section in FIG. 2, the plane of section being identified in FIG. 1 as its intersection with the tread surface 10 by the line II-II. This FIG. 2 shows the internal cavity 3 and, opening into this internal cavity 3, the measurement well 101 of the wear limit indicator device. The internal cavity 3 comprises lateral walls joined together by a bottom 31 in which there is molded a relief that forms an additional thickness 32 the dimensions of which are small in comparison with the bottom of the cavity. This additional thickness 32 occupies the entire width of the cavity 3 and has a planar top surface 320 offset by a height H with respect to the bottom 31 of the internal cavity 3. This height H is equal to the minimum groove depth set by the legislations in the countries in which the tires are to be run.

In this instance, the measurement well 101 is directed from the tread surface 10 when new towards the additional thickness 32 in such a way as to allow sight both of part of the top surface 320 of the additional thickness 32 and of part of the bottom 31 of the cavity 3. The latter part of the bottom constitutes the second part of the wear checking and monitoring device.

The measurement well 101 therefore has a bottom 1010 formed of a first part 1011 and of a second part 1012, these two parts being offset from one another in depth and in the main direction of the cavity 3, these two parts of the bottom being situated at different distances with respect to the tread surface when new, the first part 1011 being situated at a distance D1 corresponding to the wear limit and the second part 1012 being situated at a distance D2 equal to the maximum depth of the voids 3.

The measurement well 101 has a cylindrical shape of oval cross section, the major axis of this cross section being aligned with the circumferential direction of the sipe 4 on the tread surface 10 (this circumferential direction corresponds to the main direction of the cavity 3). The cross section of the measurement well 101 is suited to causing the least possible disruption to the mechanical operation of contact of the tread with the roadway while at the same time allowing sight of the wear limit. One embodiment for a heavy vehicle tire has demonstrated good results in terms of the visibility of the wear limit with an oval cross section with a minor axis equal to 6 mm and a major axis equal to 8 mm.

It is possible in an easy way to make sure that there is a difference in depth in the measurement well by using a measurement instrument according to the disclosure, this instrument being provided with two distinct means for simultaneously measuring the two depths in the well and doing so whatever the degree of tread wear. The distinct means are depicted schematically in FIG. 2 as the two arrows starting from the same level and measuring distances D1 and D2, the difference between these two distances being precisely equal to the wear limit H. Of course, this measurement instrument comprises means of displaying the first and second depths.

Figure 3:
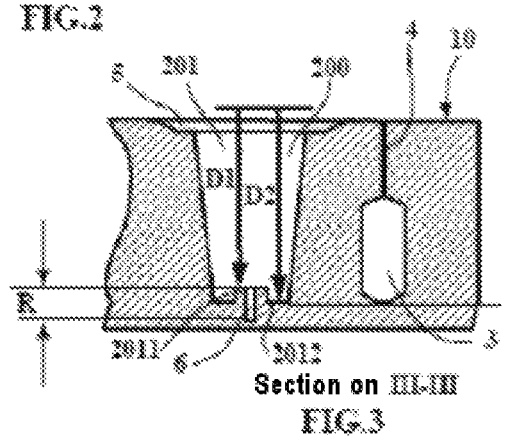
FIG. 3 shows a view in cross section of an alternative form of the disclosure.

FIG. 3 depicts in cross section an alternative form of wear indicator device 200, this one being provided with a means for making the regrooving operation that follows tread wear easier.

In this FIG. 3 it may be seen that a depression 5 is formed locally on the tread surface 10 when new, this depression having a depth equal to 0.5 mm. Opening into this depression 5 is a measurement well 201 for the wear limit indicator device 200. This measurement well 201 has a frustoconical shape, its cross section widening towards the tread surface when new.

This measurement well is molded in such a way that its bottom comprises a first part 2011 that is raised or in the form of an additional thickness. The central part 2011 is formed in such a way that its external surface is planar and situated at a distance H corresponding to the tread wear limit. This first part 2011 is extended by a second part 2012 situated at a distance from the tread surface 10 when new that is equal to the distance of the bottom of the innermost void of the tread when new.

Whether in the first alternative form or the second alternative form of the disclosure, it is also possible to form, on the bottom intended for measuring the tread wear limit when new, a regrooving well intended in the usual way to indicate the maximum depth of regrooving of the tread. This regrooving operation involving, using appropriate tools, forming new grooves by the removal of material. The maximum depth to which material can be removed corresponding to the maximum depth of the regrooving wells.

In the second alternative form of measurement well 201, such a regrooving well 6 has been depicted, this opening on to the planar external surface of the central part 2011 and having a depth R equal to the thickness of material to be removed to form new grooves.

In the case where there is a rib on the bottom of an internal cavity, this step being intended to prevent stones from attacking the bottom of this internal cavity after this cavity is opened on to the tread surface, it is judicious for this step to be interrupted to allow for the formation of a platform of which the height with respect to the bottom of the cavity corresponds to the wear limit, this platform occupying the width of the cavity and being followed by a part without a rib of which the distance with respect to the tread surface is equal to the maximum depth of the internal cavity.

Of course, the disclosure is not restricted to the embodiments described and depicted and various modifications can be made thereto without departing from the scope defined by the claims.

What is claimed as:

1. A device for monitoring the wear of a tread during running, this tread comprising at least one internal cavity having a width and being intended to form a groove open on to a tread surface after predefined partial wearing of the tread, this tread comprising a wear limit corresponding to a maximum thickness of wearable material, this tread further comprising a maximum void depth that is greater than the wear limit so as to maintain a sufficient drainage volume, this wear monitoring device formed in the tread comprising a measurement well opening permanently on to the tread surface of the tread, this measurement well having a measurement well bottom formed of a first part and of a second part which are offset from one another in the depth and in the main direction of the cavity, the first part having a width substantially equal to the width of the cavity and a planar top surface situated at a distance D1 away from the tread surface equal to the wear limit, the second part occupying the width of the cavity and being situated at a distance D2 equal to the maximum depth of the internal cavities, wherein the internal cavity has a cavity bottom that is situated at the distance D2 immediately on an opposite circumferential side of the first part from the second part, wherein a portion of first part and a portion the second part are disposed directly radially inward of the measurement well opening such that a straight measurement stick can be inserted radially through the measurement well opening to contact each of the first part and the second part.

2. The device for monitoring the wear of a tire tread according to claim 1, wherein the measurement well has an opening on to the tread surface of which the geometry is of elongate shape and suited to closing up at least in part when it comes into contact with the roadway.

3. The device for monitoring the wear of a tire tread according to claim 1, wherein the measurement well has a frustoconical shape.

4. The device for monitoring the wear of a tire tread according to claim 1, wherein, to make it easier to locate each device of the invention on the tread when new, the measurement well of the device is formed in an additional thickness molded on the tread surface of the tread when new.

5. The device for monitoring the wear of a tire tread according to claim 1, wherein the measurement well of the device is formed in a depression molded on the tread surface of the tread when new.

6. The device for monitoring the wear of a tire tread according to claim 1, wherein the measurement well of the device is oriented radially, namely in the direction of the axis of rotation of the tire.

7. The device for monitoring the wear of a tire tread according to claim 1, wherein the part of the measuring well bottom that is closest to the tread surface when new is provided with a regrooving well the depth of which corresponds to the maximum depth of the regrooving.

* * * * *